United States Patent [19]

Rauch-Puntigam et al.

[11] Patent Number: 5,030,684

[45] Date of Patent: Jul. 9, 1991

[54] ACRYLATE COPOLYMERS CONTAINING HYDROXYL AND FLUORINE GROUPS AS ADDITIVES FOR AQUEOUS ANIONIC PAINT SYSTEMS

[75] Inventors: Harald Rauch-Puntigam; Werner Staritzbichler, both of Graz; Peter Morre, Feldkirchen, all of Austria

[73] Assignee: Vianova Kunstharz, A.G., Werndorf, Austria

[21] Appl. No.: 413,718

[22] Filed: Sep. 28, 1989

[30] Foreign Application Priority Data

Sep. 28, 1988 [AT] Austria ................................ A2389/88

[51] Int. Cl.$^5$ ........................ C08L 67/00; C08L 27/12
[52] U.S. Cl. .................................... 524/513; 524/544; 526/4
[58] Field of Search ................................ 524/513, 544

[56] References Cited

U.S. PATENT DOCUMENTS

| | | | |
|---|---|---|---|
| 4,341,685 | 7/1982 | Miyake et al. | 524/544 |
| 4,529,765 | 7/1985 | Hartogeral | 524/513 |
| 4,596,841 | 6/1986 | Komishi et al. | 524/513 |

FOREIGN PATENT DOCUMENTS

| | | | |
|---|---|---|---|
| 0311052 | 4/1989 | European Pat. Off. | 524/544 |
| 0320865 | 6/1989 | European Pat. Off. | 524/513 |
| 50-29730 | 9/1975 | Japan | 524/544 |
| 50-142655 | 11/1975 | Japan | 524/513 |
| 51-37944 | 3/1976 | Japan | 524/514 |
| 57-59959 | 4/1982 | Japan | 524/513 |
| 58-96659 | 6/1983 | Japan | 524/513 |
| 61-276879 | 12/1986 | Japan | 524/513 |
| 62-158766 | 7/1987 | Japan | 524/513 |
| 02047150 | 2/1990 | Japan | 524/544 |
| 2061972 | 5/1981 | United Kingdom | 524/513 |
| 2080816 | 2/1982 | United Kingdom | 524/513 |

*Primary Examiner*—Joseph L. Schofer
*Assistant Examiner*—N. Sarofim
*Attorney, Agent, or Firm*—Breiner & Breiner

[57] ABSTRACT

Acrylate copolymers containing hydroxyl and fluorine groups as additives for aqueous anionic paint systems for the purpose of preventing surface defects are described. The acrylate copolymers contain selected amounts of hydroxyl groups originating from hydroxyethyl (meth)acrylates or hydroxypropyl (meth)acrylates and fluorine groups originating from 2-perfluoroalkethyl (meth)acrylate, in addition to carboxyl groups neutralizable with bases. The additives are used in amounts of from 0.1 to 2.0% by weight, calculated on solids content and based on the total solids content of the binder in the paint.

8 Claims, No Drawings

ACRYLATE COPOLYMERS CONTAINING HYDROXYL AND FLUORINE GROUPS AS ADDITIVES FOR AQUEOUS ANIONIC PAINT SYSTEMS

FIELD OF INVENTION

This invention relates to aqueous anionic paint systems. More particularly, the invention relates to the use of acrylate copolymers containing hydroxyl and fluorine groups as additives for aqueous anionic paint systems. Paint systems using such additives provide coatings free of surface defects.

BACKGROUND OF INVENTION

It is known that in the process of film formation aqueous coating systems are highly sensitive to extraneous substances present in the paint material, or on the substrate to be painted. This sensitivity becomes manifest in the formation of craters, dents, and similar surface defects. In primers this sensitivity can be eliminated or at least reduced by increasing the proportion of pigment. In many cases, however, especially in decorative finishes, this solution is not possible since it leads to a reduction in resistance characteristics and to an impairment of optical properties.

The sensitivity of aqueous coating systems to surface defects can also be diminished by the addition of surfactants. Because the additives are substantially incompatible with the paint material, the concentration of the additives in the region of the paint surface is frequently excessive, resulting in impaired intercoat adhesion, i.e., adhesion of subsequent paint coats. In order to avoid extreme incompatibility, it is the current practice in paints based on water-soluble binders containing carboxylate groups, to use polymeric additives which are copolymers of acid monomers and neutral ester monomers, principally (meth)acrylate monomers. By an appropriate adjustment of the acid component it is possible to achieve an optimum system efficiency. Even with such adjustment, there is considerable sensitivity to an excess of additives which leads directly to the adhesion problems described. In addition, the need for higher proportions of acid components detrimentally affects the properties of the paints and paint binders, such as their dilutability, viscosity or compatibility, and the hydrophilic and hydrophobic balance.

It is also known to use monomeric compounds containing fluorine in the preparation of aqueous polymer dispersions for use especially in the textile industry. Thus, DE 3,533,807 A discloses aqueous paste-like coatings for textiles based on hexafluoropropylenetetrafluoroethylenevinylidene fluoride copolymers. A non-crosslinked (meth)acrylic acid copolymer ammonium salt is used as a thickener. DE 3,403,880 discloses polyacrylate dispersions carrying fluoroalkyl groups for the coating of textiles. 2-perfluoroalkylethyl acrylates are polymerized with other acrylic monomers in the presence of special emulsifiers. Most of the fluorine-containing coatings known from the literature, however, are dispersions of tetrafluoroethylene polymers wherein special emulsifiers or special film-forming additives are used. See, for example, JP 48/17545 A; DE 2,837,107 A; Ep 173,071 A, and Ep 193,963.

SUMMARY OF INVENTION

We have now found that the surface defects and adhesion problems referred to above can be overcome in paint systems which comprise, as binders, resins carrying carboxyl groups which are converted to a water-thinnable form by salt formation with bases, if the acrylate copolymers which are used as additives contain, in addition to the acid groups, a selected amount of hydroxyl groups derived from hydroxyethyl (meth)acrylates or hydroxypropyl (meth)acrylates and fluorine-containing esters of (meth)acrylic acid.

Accordingly, the present invention relates to the use of acrylate copolymers as additives for aqueous anionic paint systems which contain hydroxyl groups and fluorine groups, and which are composed of -

(A) 5 to 15% by weight of (meth)acrylic acid and/or maleic acid and/or its semiesters with alkanols having 1 to 14 carbon atoms, (B) 5 to 50% by weight of hydroxyethyl (meth)acrylate and/or hydroxypropyl(meth)acrylate, (C) 15 to 89.5% by weight of alkyl (meth)acrylates whose alkyl radicals have 1 to 12 carbon atoms, (D) 0.5 to 10% by weight of a 2-perfluoroalkylethyl (meth)acrylate, and, if desired, (E) up to 10% by weight of styrene, wherein the percentages of the components (A) to (E) add up to 100. The copolymers are to have an acid value of 15 to 170 mg KOH/g, preferably 30 to 120 mg KOH/g; and a hydroxyl value of 15 to 250 mg KOH/g, preferably 20 to 200 mg KOH/g. The carboxyl groups which are present are neutralized up to at least 50% with an organic base, preferably a secondary or tertiary alkylamine or alkanolamine whose alkyl or alkanol radicals have 1 to 3 carbon atoms. The aqueous anionic paint systems containing the additives according to the present invention significantly reduce both film defects due to the surface tension of the aqueous phase in the paint, and the problems associated with intercoat adhesion, i.e., the adhesion of subsequent paint coats, apparently due to a modified distribution of the hydrophilic groups in the polymers.

The acrylate copolymers having the composition and characteristics according to the present invention are prepared in the usual manner by solvent polymerization in water-miscible or at least water-tolerating solvents such as lower alcohols, preferably butanol or glycol monoethers or diethers. Mixtures of these solvents, for example butanol and methoxypropanol, may also be employed. The acrylate copolymers useful as additives, as above stated, are characterized by the following parameters:

| Acid value | 15 to 170 mg KOH/g, preferably 30 to 120 mg KOH/g, |
|---|---|
| Hydroxyl value | 15 to 250 mg KOH/g, preferably 20 to 200 mg KOH/mg. |

The 2-perfluoroalkylethyl (meth)acrylates are used as the fluorine-containing monomers. These fluorine-containing monomers are of the general formula -

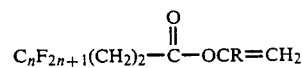

wherein n=4-14, and R is a hydrogen atom or a methyl group. Illustrative compounds are the (meth)acrylic acid esters, for example in commercially available form as a mixture containing more than 50% of 2-(perfluorooctyl)ethyl (meth)acrylate, i.e., corresponding to heptadecafluorodecyl (meth)acrylate where n=8. The carboxyl groups of the acrylate copolymers are neutralized up to at least 50% with an organic base. The neutralization is preferably carried out using secondary or tertiary alkylamines or alkanolamines wherein the alkyl or alkanol radicals have from 1 to 3 carbon atoms. Examples of such neutralization agents are diethylamine, triethylamine, di-n-propylamine, dimethylethanolamine, diisopropanolamine, and the like. The acrylate copolymers are diluted at the same time by the addition of the neutralization agent or with water after the neutralization to a solids content suitable for application. The application is usually carried out using a 50±15% solution.

The additives according to the invention are employed in amounts from 0.1 to 2.0% by weight, preferably from 0.3 to 1.0% by weight, calculated on the solids and based on the solids content of the total binder in the paint. The additives according to the invention may be used for any type of paint which is formulated using anionic, water-thinnable binders, also designated as "watersoluble" binders. These binders can be condensation resins of the polyester or alkyd resin type, copolymers of $\alpha,\beta$-unsaturated monomers or addition resins, such as modified epoxy resin esters and the like. They usually carry a sufficient number of carboxyl groups so that upon neutralization with bases the resins become water-thinnable or waterdilutable.

The testing of the additives according to the invention is advantageously performed by mixing small amounts of an interfering substance with the ready-for-use clearcoat of the binder. Styrene- and vinyltoluene-modified alkyd resins, dissolved in petroleum ether and other organic solvents, have been found particularly suitable for this test. The contaminated clearcoat is sprayed onto a degreased steel panel and cured under conditions required by the binder. The testing of the intercoat adhesion is expediently carried out by overspraying the cured test film with a stoving paint which may also be dissolved in organic solvents, and by a cross-hatch test after the film has been cured and, if desired, exposed to corrosive conditions.

The examples below illustrate the invention without in any way limiting its scope. All parts and percentages are by weight, unless indicated otherwise.

EXAMPLES 1-3

Preparation of the Additives

| Example 1: | |
| --- | --- |
| 18.0 parts of n-butanol | Part I |
| 18.0 parts of methoxypropanol | |
| 57.0 parts of butyl methacrylate | Part II |
| 30.0 parts of 2-hydroxyethyl acrylate | |
| 10.0 parts of acrylic acid | |
| 3.0 parts of heptadecafluorodecyl acrylate | |
| 1.0 parts of di-tert.-butyl peroxide | Part III |
| 6.5 parts of n-butanol | |
| 6.5 parts of methoxypropanol | |
| 12.0 parts of dimethylethanolamine | Part IV |
| Water | Part V |

Part I is placed in a reaction vessel and heated to 115° C. Part II and Part III are added to the reaction vessel at 115°–120° C. at a uniform rate over the course of five hours. When the addition is completed, the temperature is kept at 120° C. for two hours, and the end of the polymerization is checked by determining the solids content. After the theoretical solids content has been reached, Part IV is added at 40° C. The pH of a 5% aqueous test solution is 10.8. The solids content is subsequently adjusted to 50% with part V.

| Example 2: | |
| --- | --- |
| 18.0 parts of n-butanol | Part I |
| 18.0 parts of methoxypropanol | |
| 57.0 parts of butyl acrylate | Part II |
| 30.0 parts of 2-hydroxyethyl acrylate | |
| 10.0 parts of acrylic acid | |
| 3.0 parts of heptadecafluorodecyl methacrylate | |
| 1.0 parts of di-tert.-butyl peroxide | Part III |
| 6.5 parts of n-butanol | |
| 6.5 parts of methoxypropanol | |
| 12.0 parts of triethylamine | Part IV |
| Water | Part V |

The reaction procedure, pH, and solids content are as set forth in Example 1.

| Example 3: | |
| --- | --- |
| 18.0 parts of n-butanol | Part I |
| 18.0 parts of methoxypropanol | |
| 3.0 parts of styrene | Part II |
| 57.0 parts of butyl acrylate | |
| 25.0 parts of 2-hydroxyethyl methacrylate | |
| 10.0 parts of methacrylic acid | |
| 5.0 parts of heptadecafluorodecyl acrylate | |
| 1.0 parts of di-tert.-butyl peroxide | Part III |
| 6.5 parts of n-butanol | |
| 6.5 parts of methoxypropanol | |
| 12.0 parts of dimethylethanolamine | Part IV |
| Water | Part V |

The reaction procedure is the same as in Example 1. After addition of Part IV, the pH of a 5% aqueous solution is 10.0. The final solids content is again adjusted with water (Part V) to 50%.

| Comparison Example 1 (C1): | |
| --- | --- |
| 18.0 parts of n-butanol | Part I |
| 18.0 parts of methoxypropanol | |
| 82.0 parts of butyl acrylate | Part II |
| 18.0 parts of acrylic acid | |
| 1.0 parts of di-tert.-butyl peroxide | Part III |
| 6.5 parts of n-butanol | |
| 6.5 parts of methoxypropanol | |
| 15.0 parts of triethylamine | Part IV |
| 30.0 parts of water | Part V |
| 15.0 parts of triethylamine | Part VI |

The polymerization reaction is carried out as in Example 1. After partial neutralization at 40° C. with Part IV, Part V is added first and the pH is then adjusted to 8.5 using Part VI.

TEST OF THE ADDITIVES ACCORDING TO THE INVENTION (a) Preparation of Test Solution I A commercial, water-thinnable paint binder based on a saturated polyester is thinned, if desired after neutralization and addition of a melamine resin as crosslinking component, with deionized water to a solids content of 25%. Then, the resin is blended with a 10% solution of a commercial, highly styrenated alkyd resin.

The following formulation is used as an example:

| | |
|---|---|
| 120 parts of | RESYDROL VWA 11, 70% |
| 6 parts of | dimethylethanolamine (DMEA) |
| 50 parts of | monoethyleneglycol monobutylether (BUGL) |
| 17 parts of | hexamethoxymethyl melamine (HMMM) |
| 208 parts of | water |
| 5 parts of | VIALKYD AV 462, 60% in petroleum ether, thinned with BUGL/xylene (1:1) to a solids content of 10% |

The solution has an efflux time of 30–40 seconds according to DIN 53211/20° C. (RESYDROL VWA 11 and VIALKYD AV 462 are registered brand names of Vianova Kunstharz, A.G., for, respectively, a water-thinnable saturated polyester resin and a highly styrenated alkyd resin.)

film surface is assessed for craters or dents (0 = no craters; 1 = individual craters; 2 = distinct tendency to cratering; 3 = intense crater formation).

An oven-drying industrial finish, based on a non-self-crosslinking acrylate resin (75 parts of solid resin) dissolved in organic solvents, a melamine resin (25 parts of solid resin) and 80 parts of titanium dioxide of the rutile type, is applied to the film from the cured test solutions and stoved.

After a two-hour storage period under normal conditions of temperature and pressure, the intercoat adhesion is tested by a cross-hatch test according to DIN 53151. A further cross-hatch test is carried out after exposure to tropical conditions (240 hours, 40° C., 100% relative humidity) and after a subsequent two-hour storage period under normal conditions of temperature and pressure. The adhesion of the topcoat to the clearcoat is evaluated.

Table 1 is as follows:

TABLE 1

Test Mixtures and Test Results: The clearcoat which consists of 405 g of test solution I or 441 g of test solution II (100 g of solid resin in each case) are mixed with the stated amount of additive (% by weight, calculated on the solids content of the additive and based on the solids content of the binders in test solutions I and II).

| | Additive | | Crater | Cross-Hatch Value Gt | |
| | | | | After 2 Hrs | After 240 Hrs |
| Test Solution | per Example | % by Weight | Formation Rating | Under Standard Conditions | Under Tropical Conditions |
|---|---|---|---|---|---|
| I | no additive | | 3 | 0 | 1 |
| I | 1 | 0.8 | 0 | 0 | 0 |
| I | 2 | 1 | 0 | 0 | 0 |
| I | 3 | 0.3 | 0 | 0 | 1 |
| I | (C1) | 0.5 | 0 | 1–2 | 5 |
| II | no additive | | 2–3 | 0 | 1 |
| II | 1 | 0.8 | 0 | 0 | 0 |
| II | 2 | 1 | 0 | 0 | 0 |
| II | 3 | 0.3 | 0 | 0 | 1 |
| II | (C1) | 0.5 | 0 | 1 | 4 |

(b) Preparation of Test Solution II

A commercial, water-thinnable, short-oil alkyd resin RESYDROL VWA 5400, 70%, is thinned, if desired after neutralization and addition of a melamine resin as crosslinking component, with deionized water to a solids content of 25%. Then, the resin is blended with a 10% solution of a commercial, highly styrenated alkyd resin.

The following formulation is used as an example:

| | |
|---|---|
| 120 parts of | RESYDROL VWA 5400, 70% |
| 6 parts of | DMEA |
| 50 parts of | BUGL |
| 17 parts of | HMMM |
| 243 parts of | water |
| 5 parts of | VIALKYD AV 462, 60% in petroleum either, thinned with BUGL/xylene (1:1) to a solids content of 10%. |

The solution has an efflux time of 30–40 seconds according to DIN 53211/20° C.

(c) Testing OF the Additives According to the Invention for Surface Defects and for Adhesion of Subsequent Paint Coats The mixtures listed in Table 1 below are sprayed onto degreased steel panels and cured for 30 minutes at 160° C. The resultant dry film thickness is 35±5 μm. The As will be apparent to one skilled in the art, various modifications can be made within the scope of the aforesaid description. Such modifications being within the ability of one skilled in the art form a part of the present invention and are embraced by the appended claims.

What is claimed is:

1. An aqueous anionic paint composition comprising a water-thinnable binder resin carrying carboxyl groups and an acrylic copolymer additive containing hydroxyl and fluorine groups and which is composed of
   (A) 5 to 15% by weight of (meth)acrylic acid and/or maleic acid and/or its semiesters with alkanols having 1 to 14 carbon atoms,
   (B) 5 to 50% by weight of hydroxyethyl (meth)acrylate and/or hydroxypropyl(meth)-acrylate,
   (C) 15 to 89.5% by weight of alkyl (meth)acrylates having an alkyl chain of from 1 to 12 carbon atoms,
   (D) 0.5 to 10% by weight of a 2-perfluoroalkylethyl (meth)acrylate, and,
   (E) up to 10% by weight of styrene,
the percentages of the components (A) to (E) totaling 100, said copolymers having an acid value of 15 to 170 mg KOH/g and a hydroxyl value of 15 to 250 mg KOH/g, and wherein the carboxyl groups of said copolymer are neutralized to at least 50% with an organic base, said additive present in an amount of from 0.1 to 2.0%; by weight, calculated on solids and based on the solids content of the total binder in the paint.

2. An aqueous anionic paint composition comprising a water-thinnable binder resin carrying carboxyl groups and an acrylic copolymer additive containing hydroxyl and fluorine groups and which is composed of
- (A) 5 to 15% by weight of (meth)acrylic acid and/or maleic acid and/or its semiesters with alkanols having 1 to 14 carbon atoms,
- (B) 5 to 50% by weight of hydroxyethyl (meth)acrylate and/or hydroxypropyl (meth)acrylate,
- (C) 15 to 89.5% by weight of alkyl (meth)acrylates having an alkyl chain of from 1 to 12 carbon atoms,
- (D) 0.5 to 10% by weight of a 2-perfluoroalkylethyl (meth)acrylate, and,
- (E) up to 10% by weight of styrene, the percentages of the components (A) to (E) totaling 100, said copolymers having an acid value of 15 to 170 mg KOH/g and a hydroxyl value of 15 to 250 mg KOH/g, and wherein the carboxyl groups of said copolymer are neutralized to at least 50% with an organic base, said additive present in an amount of from 0.3 to 1.0% by weight, calculated on the solids and based on solids content of the total binder in the paint.

3. The paint composition of claim 1 wherein said water-thinnable binder resin is a condensation resin or a copolymer of $\alpha,\beta$-unsaturated monomers having sufficient carboxyl groups so that upon neutralization with a base the resins become water-thinnable or water-dilutable.

4. The paint composition of claim 2 wherein said water-thinnable binder resin is a condensation resin or a copolymer of $\alpha,\beta$-unsaturated monomers having sufficient carboxyl groups so that upon neutralization with a base the resins become water-thinnable or water-dilutable.

5. The paint composition of claim 3 wherein said condensation resin is a polyester resin.

6. The paint composition of claim 3 wherein said condensation resin is an alkyd resin.

7. The paint composition of claim 4 wherein said condensation resin is a polyester resin.

8. The paint composition of claim 4 wherein said condensation resin is a alkyd resin.

* * * * *